(12) United States Patent
Bigioi et al.

(10) Patent No.: US 8,155,397 B2
(45) Date of Patent: Apr. 10, 2012

(54) FACE TRACKING IN A CAMERA PROCESSOR

(75) Inventors: Petronel Bigioi, Galway (IE); Alexei Pososin, Galway (IR); Mihnea Gangea, Bucharest (RO); Stefan Petrescu, Bucharest (RO); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 1194 days.

(21) Appl. No.: 11/861,854

(22) Filed: Sep. 26, 2007

(65) Prior Publication Data

US 2009/0080713 A1   Mar. 26, 2009

(51) Int. Cl.
*G06K 9/00* (2006.01)

(52) U.S. Cl. ......... 382/118; 348/169; 375/219; 382/282

(58) Field of Classification Search .................. 382/118, 382/190, 282, 209, 167, 274; 348/169, 222.1, 348/241

See application file for complete search history.

(56) References Cited

U.S. PATENT DOCUMENTS

| | | |
|---|---|---|
| 4,047,187 A | 9/1977 | Mashimo et al. |
| 4,317,991 A | 3/1982 | Stauffer |
| 4,367,027 A | 1/1983 | Stauffer |
| RE31,370 E | 9/1983 | Mashimo et al. |
| 4,448,510 A | 5/1984 | Murakoshi |
| 4,638,364 A | 1/1987 | Hiramatsu |
| 4,796,043 A | 1/1989 | Izumi et al. |
| 4,970,663 A | 11/1990 | Bedell et al. |
| 4,970,683 A | 11/1990 | Harshaw et al. |
| 4,975,969 A | 12/1990 | Tal |
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,063,603 A | 11/1991 | Burt |
| 5,111,231 A | 5/1992 | Tokunaga |
| 5,150,432 A | 9/1992 | Ueno et al. |
| 5,161,204 A | 11/1992 | Hutcheson et al. |
| 5,164,831 A | 11/1992 | Kuchta et al. |

(Continued)

FOREIGN PATENT DOCUMENTS

EP   578508 A2   1/1994

(Continued)

OTHER PUBLICATIONS

Castrillon-Santana M. et al., "Multiple face detection at different resolutions for perceptual user interfaces", Lecture Notes in Computer Science, 2005, pp. 445-452, vol. 3522.

(Continued)

*Primary Examiner* — Wesley Tucker
*Assistant Examiner* — Aklilu Woldemariam
(74) *Attorney, Agent, or Firm* — Andrew V. Smith

(57) ABSTRACT

A method operable in a digital image acquisition system having no photographic film is provided. The method comprises receiving a relatively low resolution image of a scene from an image stream, wherein the scene potentially includes one or more faces. At least one high quality face classifier is applied to the image to identify relatively large and medium sized face regions and at least one relaxed face classifier is applied to the image to identify relatively small sized face regions. A relatively high resolution image of nominally the same scene is received and at least one high quality face classifier is applied to the identified small sized face regions in the higher resolution version of said image.

25 Claims, 2 Drawing Sheets

U.S. PATENT DOCUMENTS

| | | |
|---|---|---|
| 5,164,992 A | 11/1992 | Turk et al. |
| 5,227,837 A | 7/1993 | Terashita |
| 5,278,923 A | 1/1994 | Nazarathy et al. |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,543,952 A | 8/1996 | Yonenaga et al. |
| 5,576,759 A | 11/1996 | Kawamura et al. |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,748,764 A | 5/1998 | Benati et al. |
| 5,764,790 A | 6/1998 | Brunelli et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,912,980 A | 6/1999 | Hunke |
| 5,966,549 A | 10/1999 | Hara et al. |
| 5,978,514 A * | 11/1999 | Yamaguchi et al. .......... 382/243 |
| 5,978,519 A | 11/1999 | Bollman et al. |
| 5,990,973 A | 11/1999 | Sakamoto |
| 5,991,456 A | 11/1999 | Rahman et al. |
| 6,009,209 A | 12/1999 | Acker et al. |
| 6,016,354 A | 1/2000 | Lin et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,115,052 A | 9/2000 | Freeman et al. |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,188,777 B1 | 2/2001 | Darrell et al. |
| 6,192,149 B1 | 2/2001 | Eschbach et al. |
| 6,240,198 B1 | 5/2001 | Rehg et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,278,491 B1 | 8/2001 | Wang et al. |
| 6,282,317 B1 | 8/2001 | Luo et al. |
| 6,292,575 B1 | 9/2001 | Bortolussi et al. |
| 6,301,370 B1 | 10/2001 | Steffens et al. |
| 6,301,440 B1 | 10/2001 | Bolle et al. |
| 6,332,033 B1 | 12/2001 | Qian |
| 6,334,008 B2 | 12/2001 | Nakabayashi |
| 6,349,373 B2 | 2/2002 | Sitka et al. |
| 6,351,556 B1 | 2/2002 | Loui et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,441,854 B2 | 8/2002 | Fellegara et al. |
| 6,445,810 B2 | 9/2002 | Darrell et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,156 B1 | 2/2003 | Black et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,700,999 B1 | 3/2004 | Yang |
| 6,714,665 B1 | 3/2004 | Hanna et al. |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,798,834 B1 | 9/2004 | Murakami et al. |
| 6,801,250 B1 | 10/2004 | Miyashita |
| 6,801,642 B2 | 10/2004 | Gorday et al. |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,900,840 B1 | 5/2005 | Schinner et al. |
| 6,937,773 B1 | 8/2005 | Nozawa et al. |
| 6,940,545 B1 | 9/2005 | Ray et al. |
| 6,947,601 B2 | 9/2005 | Aoki et al. |
| 6,959,109 B2 | 10/2005 | Moustafa |
| 6,965,684 B2 | 11/2005 | Chen et al. |
| 6,967,680 B1 | 11/2005 | Kagle et al. |
| 6,977,687 B1 | 12/2005 | Suh |
| 6,980,691 B2 | 12/2005 | Nesterov et al. |
| 6,993,157 B1 | 1/2006 | Oue et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |

| | | |
|---|---|---|
| 7,027,621 B1 | 4/2006 | Prokoski |
| 7,034,848 B2 | 4/2006 | Sobol |
| 7,035,456 B2 | 4/2006 | Lestideau |
| 7,035,462 B2 | 4/2006 | White et al. |
| 7,035,467 B2 | 4/2006 | Nicponski |
| 7,038,709 B1 | 5/2006 | Verghese |
| 7,038,715 B1 | 5/2006 | Flinchbaugh |
| 7,039,222 B1 | 5/2006 | Simon et al. |
| 7,042,501 B1 | 5/2006 | Matama |
| 7,042,505 B1 | 5/2006 | DeLuca |
| 7,042,511 B2 | 5/2006 | Lin |
| 7,043,056 B2 | 5/2006 | Edwards et al. |
| 7,043,465 B2 | 5/2006 | Pirim |
| 7,050,607 B2 | 5/2006 | Li et al. |
| 7,057,653 B1 | 6/2006 | Kubo |
| 7,064,776 B2 | 6/2006 | Sumi et al. |
| 7,082,212 B2 | 7/2006 | Liu et al. |
| 7,099,510 B2 | 8/2006 | Jones et al. |
| 7,106,374 B1 | 9/2006 | Bandera et al. |
| 7,106,887 B2 | 9/2006 | Kinjo |
| 7,110,569 B2 | 9/2006 | Brodsky et al. |
| 7,110,575 B2 | 9/2006 | Chen et al. |
| 7,113,641 B1 | 9/2006 | Eckes et al. |
| 7,119,838 B2 | 10/2006 | Zanzucchi et al. |
| 7,120,279 B2 | 10/2006 | Chen et al. |
| 7,146,026 B2 | 12/2006 | Russon et al. |
| 7,151,843 B2 | 12/2006 | Rui et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,190,829 B2 | 3/2007 | Zhang et al. |
| 7,194,114 B2 | 3/2007 | Schneiderman |
| 7,200,249 B2 | 4/2007 | Okubo et al. |
| 7,218,759 B1 | 5/2007 | Ho et al. |
| 7,227,976 B1 | 6/2007 | Jung et al. |
| 7,254,257 B2 | 8/2007 | Kim et al. |
| 7,269,292 B2 | 9/2007 | Steinberg |
| 7,274,822 B2 | 9/2007 | Zhang et al. |
| 7,274,832 B2 | 9/2007 | Nicponski |
| 7,289,664 B2 | 10/2007 | Enomoto |
| 7,295,233 B2 | 11/2007 | Steinberg et al. |
| 7,315,630 B2 | 1/2008 | Steinberg et al. |
| 7,315,631 B1 | 1/2008 | Corcoran et al. |
| 7,317,815 B2 | 1/2008 | Steinberg et al. |
| 7,321,670 B2 | 1/2008 | Yoon et al. |
| 7,324,670 B2 | 1/2008 | Kozakaya et al. |
| 7,324,671 B2 | 1/2008 | Li et al. |
| 7,336,821 B2 | 2/2008 | Ciuc et al. |
| 7,336,830 B2 | 2/2008 | Porter et al. |
| 7,352,394 B1 | 4/2008 | DeLuca et al. |
| 7,362,210 B2 | 4/2008 | Bazakos et al. |
| 7,362,368 B2 | 4/2008 | Steinberg et al. |
| 7,403,643 B2 | 7/2008 | Ianculescu et al. |
| 7,430,369 B2 | 9/2008 | Fukui |
| 7,437,998 B2 | 10/2008 | Burger et al. |
| 7,440,593 B1 | 10/2008 | Steinberg et al. |
| 7,460,695 B2 * | 12/2008 | Steinberg et al. ............. 382/118 |
| 7,469,055 B2 | 12/2008 | Corcoran et al. |
| 7,515,740 B2 | 4/2009 | Corcoran et al. |
| 7,616,233 B2 * | 11/2009 | Steinberg et al. ........... 348/222.1 |
| 7,809,162 B2 * | 10/2010 | Steinberg et al. ............. 382/103 |
| 7,844,076 B2 * | 11/2010 | Corcoran et al. ............. 382/103 |
| 2001/0005222 A1 | 6/2001 | Yamaguchi |
| 2001/0028731 A1 | 10/2001 | Covell et al. |
| 2001/0031142 A1 | 10/2001 | Whiteside |
| 2001/0038712 A1 | 11/2001 | Loce et al. |
| 2001/0038714 A1 | 11/2001 | Masumoto et al. |
| 2002/0105662 A1 | 8/2002 | Patton et al. |
| 2002/0106114 A1 * | 8/2002 | Yan et al. ..................... 382/118 |
| 2002/0114535 A1 | 8/2002 | Luo |
| 2002/0118287 A1 | 8/2002 | Grosvenor et al. |
| 2002/0136433 A1 | 9/2002 | Lin |
| 2002/0141640 A1 | 10/2002 | Kraft |
| 2002/0150662 A1 | 10/2002 | Dewis et al. |
| 2002/0168108 A1 | 11/2002 | Loui et al. |
| 2002/0172419 A1 | 11/2002 | Lin et al. |
| 2002/0181801 A1 | 12/2002 | Needham et al. |
| 2002/0191861 A1 | 12/2002 | Cheatle |
| 2003/0012414 A1 | 1/2003 | Luo |
| 2003/0023974 A1 | 1/2003 | Dagtas et al. |
| 2003/0025812 A1 | 2/2003 | Slatter |
| 2003/0035573 A1 | 2/2003 | Duta et al. |
| 2003/0044070 A1 | 3/2003 | Fuersich et al. |
| 2003/0044177 A1 | 3/2003 | Oberhardt et al. |
| 2003/0048950 A1 | 3/2003 | Savakis et al. |
| 2003/0052991 A1 | 3/2003 | Stavely et al. |
| 2003/0059107 A1 | 3/2003 | Sun et al. |
| 2003/0059121 A1 | 3/2003 | Savakis et al. |
| 2003/0071908 A1 | 4/2003 | Sannoh et al. |
| 2003/0084065 A1 | 5/2003 | Lin et al. |
| 2003/0095197 A1 | 5/2003 | Wheeler et al. |
| 2003/0107649 A1 | 6/2003 | Flickner et al. |
| 2003/0118216 A1 | 6/2003 | Goldberg |
| 2003/0123713 A1 | 7/2003 | Geng |
| 2003/0123751 A1 | 7/2003 | Krishnamurthy et al. |
| 2003/0142209 A1 | 7/2003 | Yamazaki et al. |
| 2003/0151674 A1 | 8/2003 | Lin |
| 2003/0174773 A1 | 9/2003 | Comaniciu et al. |
| 2003/0202715 A1 | 10/2003 | Kinjo |
| 2004/0022435 A1 | 2/2004 | Ishida |
| 2004/0041121 A1 | 3/2004 | Yoshida et al. |
| 2004/0095359 A1 | 5/2004 | Simon et al. |
| 2004/0114904 A1 | 6/2004 | Sun et al. |
| 2004/0120391 A1 | 6/2004 | Lin et al. |
| 2004/0120399 A1 | 6/2004 | Kato |
| 2004/0125387 A1 | 7/2004 | Nagao et al. |
| 2004/0170397 A1 | 9/2004 | Ono |
| 2004/0175021 A1 * | 9/2004 | Porter et al. ................. 382/118 |
| 2004/0179719 A1 | 9/2004 | Chen et al. |
| 2004/0218832 A1 | 11/2004 | Luo et al. |
| 2004/0223063 A1 | 11/2004 | DeLuca et al. |
| 2004/0228505 A1 | 11/2004 | Sugimoto |
| 2004/0233301 A1 | 11/2004 | Nakata et al. |
| 2004/0234156 A1 | 11/2004 | Watanabe et al. |
| 2005/0013479 A1 | 1/2005 | Xiao et al. |
| 2005/0013603 A1 | 1/2005 | Ichimasa |
| 2005/0018923 A1 | 1/2005 | Messina et al. |
| 2005/0031224 A1 | 2/2005 | Prilutsky et al. |
| 2005/0041121 A1 | 2/2005 | Steinberg et al. |
| 2005/0068446 A1 | 3/2005 | Steinberg et al. |
| 2005/0068452 A1 | 3/2005 | Steinberg et al. |
| 2005/0069208 A1 | 3/2005 | Morisada |
| 2005/0089218 A1 | 4/2005 | Chiba |
| 2005/0104848 A1 | 5/2005 | Yamaguchi et al. |
| 2005/0105780 A1 | 5/2005 | Ioffe |
| 2005/0128518 A1 | 6/2005 | Tsue et al. |
| 2005/0140801 A1 | 6/2005 | Prilutsky et al. |
| 2005/0185054 A1 | 8/2005 | Edwards et al. |
| 2005/0275721 A1 | 12/2005 | Ishii |
| 2006/0006077 A1 | 1/2006 | Mosher et al. |
| 2006/0008152 A1 | 1/2006 | Kumar et al. |
| 2006/0008171 A1 | 1/2006 | Petschnigg et al. |
| 2006/0008173 A1 | 1/2006 | Matsugu et al. |
| 2006/0018517 A1 | 1/2006 | Chen et al. |
| 2006/0029265 A1 | 2/2006 | Kim et al. |
| 2006/0039690 A1 | 2/2006 | Steinberg et al. |
| 2006/0050933 A1 | 3/2006 | Adam et al. |
| 2006/0056655 A1 | 3/2006 | Wen et al. |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098875 A1 | 5/2006 | Sugimoto |
| 2006/0098890 A1 | 5/2006 | Steinberg et al. |
| 2006/0120599 A1 | 6/2006 | Steinberg et al. |
| 2006/0133699 A1 | 6/2006 | Widrow et al. |
| 2006/0140455 A1 | 6/2006 | Costache et al. |
| 2006/0147192 A1 | 7/2006 | Zhang et al. |
| 2006/0153472 A1 | 7/2006 | Sakata et al. |
| 2006/0177100 A1 | 8/2006 | Zhu et al. |
| 2006/0177131 A1 | 8/2006 | Porikli |
| 2006/0187305 A1 | 8/2006 | Trivedi et al. |
| 2006/0203106 A1 | 9/2006 | Lawrence et al. |
| 2006/0203107 A1 | 9/2006 | Steinberg et al. |
| 2006/0204034 A1 | 9/2006 | Steinberg et al. |
| 2006/0204055 A1 | 9/2006 | Steinberg et al. |
| 2006/0204056 A1 | 9/2006 | Steinberg et al. |

| | | |
|---|---|---|
| 2006/0204058 A1 | 9/2006 | Kim et al. |
| 2006/0204110 A1 | 9/2006 | Steinberg et al. |
| 2006/0210264 A1 | 9/2006 | Saga |
| 2006/0227997 A1 | 10/2006 | Au et al. |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0047768 A1 | 3/2007 | Gordon et al. |
| 2007/0053614 A1 | 3/2007 | Mori et al. |
| 2007/0070440 A1 | 3/2007 | Li et al. |
| 2007/0071347 A1* | 3/2007 | Li et al. ............. 382/254 |
| 2007/0091203 A1 | 4/2007 | Peker et al. |
| 2007/0098303 A1 | 5/2007 | Gallagher et al. |
| 2007/0110305 A1 | 5/2007 | Corcoran et al. |
| 2007/0110417 A1 | 5/2007 | Itokawa |
| 2007/0116379 A1 | 5/2007 | Corcoran et al. |
| 2007/0116380 A1 | 5/2007 | Ciuc et al. |
| 2007/0154095 A1* | 7/2007 | Cao et al. ............. 382/190 |
| 2007/0154096 A1 | 7/2007 | Cao et al. |
| 2007/0160307 A1 | 7/2007 | Steinberg et al. |
| 2007/0189748 A1 | 8/2007 | Drimbarean et al. |
| 2007/0189757 A1 | 8/2007 | Steinberg et al. |
| 2007/0201724 A1 | 8/2007 | Steinberg et al. |
| 2007/0201725 A1 | 8/2007 | Steinberg et al. |
| 2007/0201726 A1 | 8/2007 | Steinberg et al. |
| 2007/0263104 A1 | 11/2007 | DeLuca et al. |
| 2007/0273504 A1 | 11/2007 | Tran |
| 2007/0296833 A1 | 12/2007 | Corcoran et al. |
| 2008/0002060 A1 | 1/2008 | DeLuca et al. |
| 2008/0013798 A1 | 1/2008 | Ionita et al. |
| 2008/0013799 A1 | 1/2008 | Steinberg et al. |
| 2008/0013800 A1* | 1/2008 | Steinberg et al. ............. 382/118 |
| 2008/0019565 A1 | 1/2008 | Steinberg |
| 2008/0037827 A1* | 2/2008 | Corcoran et al. ............. 382/103 |
| 2008/0037838 A1* | 2/2008 | Ianculescu et al. ............. 382/118 |
| 2008/0037839 A1 | 2/2008 | Corcoran et al. |
| 2008/0043121 A1 | 2/2008 | Prilutsky et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0144966 A1 | 6/2008 | Steinberg et al. |
| 2008/0175481 A1 | 7/2008 | Petrescu et al. |
| 2008/0186389 A1 | 8/2008 | DeLuca et al. |
| 2008/0205712 A1 | 8/2008 | Ionita et al. |
| 2008/0219517 A1 | 9/2008 | Blonk et al. |
| 2008/0240555 A1 | 10/2008 | Nanu et al. |
| 2008/0267461 A1* | 10/2008 | Ianculescu et al. ............. 382/118 |
| 2009/0002514 A1 | 1/2009 | Steinberg et al. |
| 2009/0003652 A1 | 1/2009 | Steinberg et al. |
| 2009/0003708 A1 | 1/2009 | Steinberg et al. |
| 2009/0052749 A1 | 2/2009 | Steinberg et al. |
| 2009/0087030 A1 | 4/2009 | Steinberg et al. |
| 2009/0087042 A1 | 4/2009 | Steinberg et al. |
| 2009/0208056 A1 | 8/2009 | Corcoran et al. |
| 2010/0210410 A1 | 8/2010 | Kaltenbach et al. |

FOREIGN PATENT DOCUMENTS

| | | |
|---|---|---|
| EP | 984386 A2 | 3/2000 |
| EP | 1128316 A1 | 8/2001 |
| EP | 1391842 A2 | 2/2004 |
| EP | 1398733 A1 | 3/2004 |
| EP | 1626569 A1 | 2/2006 |
| EP | 1 785 914 A | 5/2007 |
| GB | 2370438 A1 | 6/2002 |
| JP | 5260360 A2 | 10/1993 |
| JP | 2005128628 A | 5/2005 |
| JP | 2005129070 A2 | 5/2005 |
| JP | 25164475 A2 | 6/2005 |
| JP | 26005662 A2 | 1/2006 |
| JP | 26254358 A2 | 9/2006 |
| JP | 2007135115 A | 5/2007 |
| JP | 2010500836 T | 1/2010 |
| JP | 2010520542 T | 6/2010 |
| WO | WO-0133497 A1 | 5/2001 |
| WO | WO-02052835 A2 | 7/2002 |
| WO | WO-03028377 A1 | 4/2003 |
| WO | WO-2006045441 A1 | 5/2006 |
| WO | WO-2007095477 A2 | 8/2007 |
| WO | WO-2007095483 A2 | 8/2007 |
| WO | WO-2007095553 A2 | 8/2007 |
| WO | WO-2007142621 A1 | 12/2007 |
| WO | WO-2008015586 A2 | 2/2008 |
| WO | WO-2008017343 A1 | 2/2008 |
| WO | WO-2008018887 A1 | 2/2008 |
| WO | WO-2008023280 A2 | 2/2008 |
| WO | WO-2008104549 A2 | 9/2008 |
| WO | WO2008120932 A1 | 10/2008 |
| WO | WO2009004901 A1 | 1/2009 |
| WO | WO2009/039876 A1 | 4/2009 |

OTHER PUBLICATIONS

Chang Huang et al., "Learning Sparse Features in Granular Space for Multi-View Face Detection", Automatic Face and Gesture Recognition, 7th International Conference on Southampton, 2006, pp. 401-407.

Extended European Search Report, dated Jan. 15, 2010, including, pursuant to Rule 62 EPC, the supplementary European Search Report and the European search opinion, for European application No. 06802192.2, dated Jan. 7, 2010, 8 pages.

Final Office Action mailed Oct. 13, 2010, for U.S. Appl. No. 11/765,899, filed Jun. 20, 2007.

Final Office Action mailed Sep. 22, 2010, for U.S. Appl. No. 11/688,236, filed Mar. 19, 2007.

Kawato S. et al., "Scale-adaptive face detection and tracking in real-time with SSR filters and Support Vector Machine", IEICE Trans. On Information and Systems, 2005, pp. 2857-2863, vol. 88 (12).

Non-Final Office Action mailed Apr. 7, 2010, for U.S. Appl. No. 12/333,221, filed Dec. 11, 2008.

Notice of Allowance mailed Oct. 5, 2010, for U.S. Appl. No. 12/262,071, filed Oct. 30, 2008.

Notice of Allowance mailed Oct. 13, 2010, for U.S. Appl. No. 12/482,305, filed Jun.10, 2009.

Notice of Allowance mailed Oct. 15, 2010, for U.S. Appl. No. 11/554,539, filed Oct. 30, 2006.

Notice of Allowance mailed Oct. 22, 2010, for U.S. Appl. No. 12/262,061, filed Oct. 30, 2008.

Notice of Allowance mailed Sep. 8, 2010, for U.S. Appl. No. 12/333,221, filed Dec. 11, 2008.

PCT International Preliminary Report on Patentability (IPRP) for PCT Application PCT/EP2007/009763, dated Sep. 11, 2009, 8 pages.

Pham M. T. et al., "Detection Caching for Faster Object Detection", Proc. IEEE Workshop on Modeling people and Human Interaction, 2005, pp. 1-8.

Charay Lerdsudwichai, Mohamed Abdel-Mottaleb and A-Nasser Ansari, "Tracking multiple people with recovery from partial and total occlusion", Pattern Recognition, vol. 38, Issue 7, Jul. 2005, pp. 1059-1070, ISSN: 0031-3203 doi>10.1016/j.patcog.2004.11.022.

Chow G et al., Towards a System for Automatic Facial Feature Detection, Pattern Recognition. Elsevier. GB. vol. 1. 26. No. 12, Dec. 1, 1993. pp. 1739-1755. XP000420368. ISSN: 0031-3203. DOI: DOI:I0.I016/0031-3203(93)90173-T.

Deng, Ya-Feng et al., "Fast and Robust face detection in video, http://rlinks2.dialog.com/NASApp/ChannelWEB/DialogProServlet?ChName=engineering", International Conference on Machine Learning and Cybernetics, 2005.

Fernandez, Anna T. et al., Synthetic Elevation Beamforming and Image Acquisition Capabilities Using an 8x 128 1.75D Array, The Technical Institute of Electrical and Electronics Engineers., Abstract Printed from http://www.ieee-uffc.org/archive/uffc/trans/toc/abs/03/t0310040.htm.

Final Office Action mailed Jul. 28, 2011 for U.S. Appl. No. 12/063,089, filed Feb. 6, 2008.

Gael Jaffre and Philippe Joly, "Improvement of a Person Labelling Method Using Extracted Knowledge on Costume", Jan. 1, 2005, Computer Analysis of Images and Patterns Lecture Notes in Computer Science; LNCS, Springer, Berlin, DE, pp. 489-497, XP019019231, ISBN: 978-3-540-28969-2.

Hieu T. Nguyen, and Arnold W. Smeulders, "Robust Tracking Using Foreground-Background Texture Discrimination", International Journal of Computer Vision, Kluwer Academic Publishers, BO LNKDDOI:10.1007/S11263-006-7067-X, vol. 69, No. 3, May 1, 2006, pp. 277-293, XP019410143, ISSN: 1573-1405.

Mark Everingham, Josef Sivic and Andrew Zisserman, "Hello! My name is . . . Buffy"—Automatic Naming of Characters in TV Video, Proceedings of the British Machine Vision, Conference (2006), Jan. 1, 2006, pp. 1-10, XP009100754.

Ming Yang, Fengjun LV, Wei Xu, and Yihong Gong, Detection Driven Adaptive Multi-cue Integration for Multiple Human Tracking, IEEE 12th International Conference on Computer Vision (ICCV), Sep. 30, 2009, pp. 1554-1561, XP002607967.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Non-Final Office Action mailed Apr. 6, 2011, for U.S. Appl. No. 12/063,089, filed Feb. 6, 2008.

Non-Final Office Action mailed Nov. 9, 2010, for U.S. Appl. No. 12/637,664, filed Dec. 14, 2009.

Partial European Search Report (R. 64 EPC) for European patent application No. 10163739.5, report dated Jun. 29, 2011, 6 pages.

PCT International Preliminary Report on Patentability for PCT Application No. PCT/EP2007/005330, mailed on Aug. 29, 2008, 14 pages.

PCT International Preliminary Report on Patentability for PCT Application No. PCT/US2006/032959, mailed on Feb. 17, 2009, 3 pages.

PCT International Search Report and the Written Opinion of the International Searching Authority, for PCT Application No. PCT/EP2007/005330, dated Sep. 28, 2007, 5 pages.

PCT International Search Report and the Written Opinion of the International Searching Authority, for PCT Application No. PCT/US2006/032959, dated Mar. 6, 2007, 3 pages.

PCT Notification of Transmittal of the International Search Report and the Written Opinion of the International Searching Authority, or the Declaration, for PCT Application No. PCT/EP2010/063293, dated Nov. 12, 2010, 13 pages.

Tjahyadi et al., "Application of the DCT Energy Histogram for Face Recognition", Proceedings of the 2nd International Conference on Information Technology for Application, 2004, pp. 305-310.

Xuefeng Song, and Ram Nevatia, "Combined Face-Body Tracking in Indoor Environment, Pattern Recognition", 2004. ICPR 2004, Proceedings of the 17th International Conference on Cambridge, UK Aug. 23-26, 2004, Piscataway, NJ, USA, IEEE, LNKDDOI: 10.1109/Icpr.2004.1333728, vol. 4, Aug. 23, 2004, pp. 159-162, XP010723886, ISBN: 978-0-7695-2128-2.

Zhang D D Ed—Zhang D D: "Automated Biometrics/7 Face Recognition". Jan. 1, 2000. Automated Biometrics: Technologies and Systems. Norwell. Ma : Kluwer Academic Publ. US. pp. 137-1581-5. XP002485295. ISBN: 978-0-7923-7856-3.

PCT Notification of Transmittal of the International Search Report and the Written Opinion of the International Searching Authority, or the Declaration, for PCT Application No. PCT/EP2007/009763, paper dated Jun. 17, 2008, 11 pages.

Sebastien Roux et al., Embedded Convolutional Face Finder, Multimedia and Expo, 2006 IEEE International Conference on IEEE, PI, Jul. 1, 2006, pp. 285-288, XP031032828 ISBN: 978-1-4244-0366-0.

Heisele B et al., Hierarchical Classification and Feature Reduction for Fast Face Detection with Support Vector Machines, Pattern Recognition, Elsevier, GB, Sep. 1, 2003, vol. 36, No. 9, pp. 2007-2017, XP004429549,ISSN: 0031-3203.

Ming-Hsuan Yang and Narendra Ahuja, Face Detection and Gesture Recognition for Human-Computer Interaction, Kluwer Academic Publishers, United Kingdom , 2004, p. 33-p. 35; XP002484603.

Aoki, Hiroyuki et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICPR '00), 2000, vol. 2.

Batur et al., "Adaptive Active Appearance Models", IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Mass Inst of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9—Issue 2.

Buenaposada, J., "Efficiently estimating 1-3,16 facial expression and illumination in appearance based tracking, Retrieved from the Internet: URL:http://www.bmva.ac.uk/bmvc/2006/ [retrieved on Sep. 1, 2008]", Proc. British machine vision conference, 2006.

Chang, T., "Texture Analysis and Classification with Tree-Structured Wavelet Transform", IEEE Transactions on Image Processing, 1993, pp. 429-441, vol. 2—Issue 4.

Cootes T. et al., "Modeling Facial Shape and Appearance, S. Li and K. K. Jain (Eds.): "Handbook of face recognition", XP002494037", 2005, Chapter 3, Springer.

Cootes, T.F. et al., "A comparative evaluation of active appearance model algorithms", Proc. 9th British Machine Vison Conference. British Machine Vision Association, 1998, pp. 680-689.

Cootes, T.F. et al., "On representing edge structure for model matching", Proc. IEEE Computer Vision and Pattern Recognition. 2001, pp. 1114-1119.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Crowley, J. et al., "Multi-modal tracking of faces for video communication, http://citeseer.ist.psu.edu/crowley97multimodal.html", In Comp Vision and Patent Rec. 1997.

Dalton, John, "Digital Cameras and Electronic Color Image Acquisition, Abstract printed from http://csdl.computer.org/comp/proceedings/compcon/1996/7414/00/74140431abs.htm", C0MPC0N Spring '96 41st IEEE International Conference, 1996.

Demirkir, C. et al., "Face detection using boosted tree classifier stages", Proceedings of the IEEE 12th Signal Processing and Communications Applications Conference, 2004, pp. 575-578.

Donner, Rene el al., "Fast Active Appearance Model Search Using Canonical Correlation Analysis", IEEE Transactions on Pattern Analysis and Machine Intelligence, 2006, pp. 1690-1694, vol. 28—Issue 10.

Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

Examination Report for European patent application No. 05792584.4, dated May 13, 2008. 8 pgs.

Feraud, R. et al., "A Fast and Accurate Face Detector Based on Neural Networks", IEEE Transactions on Pattern Analysis and Machine Intelligence, 2001, pp. 42-53, vol. 23—Issue 1.

Fernandez, Anna T. et al., "Synthetic Elevation Beamforming and Image Acquisition Capabilities Using an 8x 128 1.75D Array, Abstract Printed from http://www.ieec-uffc.org/archive/uffc/trans/toc/abs/03/t0310040.htm", The Technical Institute of Electrical and Electronics Engineers.

Froba, B. et al., "Face detection with the modified census transform", Proceedings of The Sixth IEEE International Conference on Automatic Face and Gesture Recognition, 2004, pp. 91-96.

Froba, B. et al., "Real time face detection, Kauai, Hawai Retrieved from the Internet:URL:http://www.embassi.de/publi/veroeffent/

Froeba.pdf [retrieved on Oct. 23, 2007]", Dept. of Applied Electronics, Proceedings of Iasted "Signal and Image Processing", 2002, pp. 1-6.
Gangaputra, Sachin et al., "A Unified Stochastic Model for Detecting and Tracking Faces, http://portal.acm.org/citation.cfm?id=1068818andcoll=GUIDEandd1=GUIDEandCF-ID=6809268andCFTOKEN=82843223", Proceedings of the The 2nd Canadian Conference on Computer and Robot Vision (CRV 2005), 2005, pp. 306-313, vol. 00, IEEE Computer Society.
Garnaoui, H.H. et al., "Visual Masking and the Design of Magnetic Resonance Image Acquisition, Abstract printed from http://csdl.computer.org/comp/proccedings/icip/1995/7310/01/73100625abs.htm", International Conference on Image Processing, 1995, vol. 1.
Gaubatz, Matthew et al., "Automatic Red-Eye Detection and Correction", IEEE ICIP, Proceedings 2002 Intl Conference on Image Processing, 2002, pp. 1-804-1-807, vol. 2—Issue 3.
Gerbrands, J., "On the Relationships Between SVD, KLT, and PCA", Pattern Recognition, 1981, pp. 375-381, vol. 14, Nos. 1-6.
Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2. Blackwell Publishing for the Royal Statistical Society.
Hayashi, S. et al., "A Detection Technique for Degraded Face Images", Conference on Computer Vision and Pattern Recognition, 2006, pp. 1506 1512, vol. 2, IEEE Computer Society.
Hou, Xinwen et al., "Direct Appearance Models". IEEE, 2001, pp. I-828-I-833.
Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.
Huang, J. et al., "Detection of human faces using decision trees, http://doLieeecomputersociety.org/10.1109/Recognition", 2nd International Conference on Automatic Face and Gesture Recognition (FG '96), IEEE Xplorc, 2001. p. 248.
Huber, Reinhold et al., "Adaptive Aperture Control for Image Acquisition, Abstract printed from http://csdl.computer.org/comp/proceedings/wacv/2002/1858/00/18580320abs.htm.", Sixth IEEE Workshop on Applications of Computer Vision, 2002.
Isukapalli, Ramana et al., "Learning a dynamic classification method to detect faces and identify facial expression, http://rlinks2.dialog.com/NASApp/ChannelWEB/DialogProServlet?ChName=engineering", International Workshop on Analysis and Modelling of Faces and Gestures, AMFG 2005, In Lecture Notes in Computer Science. 2005, vol. 3723.
Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.
Jones, M et al., "Fast multi-view face detection, http://www.merl.com/papers/docs/TR2003-96.pdf", Mitsubishi Electric Research Lab, 2003, 10 pgs.
Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.
Kita, Nobuyuki et al., "Archiving Technology for Plant Inspection Images Captured by Mobile Active Cameras 4D Visible Memory, Abstract printed from http://csdl.computer.org/comp/proceedings/3dpvt/2002/1521/00/15210208abs.htm", 1st International Symposium on 3D Data Processing Visualization and Transmission (3DPVT '02), 2002.
Kouzani, A.Z., "Illumination-Effects Compensation in Facial Images Systems", Man and Cybernetics, IEEE SMC '99 Conference Proceedings, 1999, pp. VI-840-VI-844, vol. 6.
Kozubek, Michal et al., "Automated Multi-view 3D Image Acquisition in Human Genome Research, Abstract printed from http://csdl.computer.org/comp/proceedings/3pvt/2002/1521/00/1521009labs.htm", 1st Intl Symposium on 3D Data Processing Visualization and Transmission (3DPVT '02), 2002.
Krishnan, Arun, "Panoramic Image Acquisition, Abstract printed from http://csdl.computer.org/comp/proceedings/cvpr/1996/7258/00/72580379abs.htm", Conference on Computer Vision and Pattern Recognition (CVPR '96), 1996.
Lai, J.H. et al., "Face recognition using holistic Fourier in variant features, http://digitalimaging.inf.brad.ac.uk/publication/pr34-1.pdf.", Pattern Recognition, 2001, pp. 95-109, vol. 34.
Lei et al., "A CBIR Method Based on Color-Spatial Feature", IEEE 10th Ann. Int. Conf., 1999.
Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.
Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.
Matthews, I. et al., "Active appearance models revisited. Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.
Mekuz, N. et al., "Adaptive Step Size Window Matching for Detection", Proceedings of the 18th International Conference on Pattern Recognition, 2006, pp. 259-262, vol. 2.
Moghaddam, Baback et al., "Bayesian Modeling of Facial Similarity, http://citeseer.ist.psu.edu/article/moghaddam98bayesian.html", Advances in Neural Information Processing Systems (NIPS 1998), 1998, pp. 910-916.
Nayak et al., "Automatic illumination correction for scene enhancement and objection tracking, XP005600656, ISSN: 0262-8856", Image and Vision Computing, 2006, pp. 949-959, vol. 24—Issue 9.
Nordstrom, M.M. et al., "The IMM face database an annotated dataset of 240 face images, http://www2.imm.dtu.dk/pubdb/p.php?3160", Informatics and Mathematical Modelling, 2004.
Ohta, Y-I et al., "Color Information for Region Segmentation, XP008026458", Computer Graphics and Image Processing, 1980, pp. 222-241, vol. 13—Issue 3, Academic Press.
Park, Daechul et al., "Lenticular Stereoscopic Imaging and Displaying Techniques with no Special Glasses. Abstract printed from http://csdl.computer.org/comp/proceedings/icip/1995/7310/03/73103137abs.htm", International Conference on Image Processing, 1995, vol. 3.
PCT International Preliminary Report on Patentability (IPRP) for PCT Application PCT/EP2005/011010, dated Jan. 23, 2007, 18 pages.
PCT International Search Report and Written Opinion of the International Searching Authority, or the Declaration, for PCT Application No. PCT/US2006/021393, filed Jun. 2, 2006, paper dated Mar. 29, 2007, 12 pgs.
PCT International Search Report and Written Opinion of the International Searching Authority, or the Declaration, for PCT Application No. PCT/US2006/060392, filed Oct. 31, 2006, paper dated Sep. 19, 2008, 9 pgs.
PCT Notification of Transmittal of the International Search Report and the Written Opinion of the International Searching Authority, or the Declaration for PCT Application No. PCT/US2006/032959, dated Mar. 6, 2007, 8 pages.
PCT Notification of Transmittal of the International Search Report and the Written Opinion of the International Searching Authority, or the Declaration for PCT/EP/2005/011010, dated Jan. 23, 2006, 14 pages.
PCT Notification of Transmittal of the International Search Report and the Written Opinion of the International Searching Authority, or the Declaration, for PCT Application No. PCT/EP2007/005330, filed Jun. 18, 2007, paper dated Sep. 28, 2007, 11 pages.
PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2008/001510 dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

PCT Notification of Transmittal of the International Search Report and the Written Opinion of the International Searching Authority, or the Declaration, for PCT Application No. PCT/IB2007/003724, dated Aug. 28, 2008, 9 pages.

PCT Notification of Transmittal of the International Search Report and the Written Opinion of the International Searching Authority, or the Declaration, for PCT Application No. PCT/US2008/067746, dated Sep. 10, 2008, 8 pages.

Romdhani, S. et al., "Face Identification by Fitting a 3D Morphable Model using linear Shape and Texture Error Functions, XP003018283", European Conf on Computer Vision, 2002, pp. 1-15.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence, 1998, pp. 23-38, p. 92, vol. 20—Issue 1.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl/computer.org/comp/proccedings/imac/1995/7560/00/75600071abs.htm", 4th International Conference on Image Management and Communication ( IMAC '95), 1995.

Sim, T. et al., "The CMU Pose, Illumination, and Expression (PIE) Database of Human Faces Robotics Institute, Tech. Report, CMU-RI-TR-01-02", 2001, 18 pgs, Carnegie Mellon University.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", Intl Conf on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference on Chicago, IL, USA, IEEE Comput. Soc, 1998, pp. 163-167, vol. 3.

Song, Hong et al., "Face detection and segmentation for video surveillance Language: Chinese. http://rlinks2.dialog.com/NASApp/ChannelWEB/DialogProServlet?ChName=engineering", Binggong Xuebao/Acta Armamentarii, 2006, pp. 252-257, vol. 27—Issue 2.

Soriano, M. et al., "Making Saturated Facial Images Useful Again, XP002325961, ISSN: 0277-786X", Proceedings of The Spie, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue 1.

Stricker et al., "Similarity of color images", SPIE Proc, 1995, pp. 1-12, vol. 2420.

Sublett, J.W. et al., "Design and Implementation of a Digital Teleultrasound System for Real-Time Remote Diagnosis. Abstract printed from http://csdl.computer.org/comp/proceedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd International Conference on Information Technology for Application. 2004, pp. 305-310.

Tkalcic, M. et al., "Colour spaces perceptual, historical and applicational background, ISBN: 0-7803-7763-X", IEEE, EUROCON, 2003, pp. 304-308, vol. 1.

Turk, Matthew et al., "Eigenfaces for Recognition", Journal of Cognitive Neuroscience, 1991, 17 pgs, vol. 3—Issue 1.

Turkan, Mehmet et al., "Human face detection in video using edge projections, Conference: Visual Information Processing XV, http://rlinks2.dialog.com/NASApp/ChannelWEB/DialogProServlet?ChName=engineering", Proceedings of SPIE—The International Society for Optical Engineering Visual Information Processing. 2006, vol. 6246.

Twins Crack Face Recognition Puzzle, Internet article http://www.cnn.com/2003/TECH/ptech/03/10/israel.twins.reul/index.html, printed Mar. 10, 2003, 3 pages.

U.S. Appl. No. 11/554,539, filed Oct. 30, 2006, entitled Digital Image Processing Using Face Detection and Skin Tone Information.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154. vol. 57—Issue 2, Kluwer Academic Publishers.

Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research and Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming-Hsuan et al., "Detecting Faces in Images: A Survey, ISSN:0162-8828, http://portal.acm.org/citation.cfm?id=505621andcoll=GUIDEanddl=GUIDEandCFID=680-9268andCFTOKEN=82843223.", IEEE Transactions on Pattern Analysis and Machine Intelligence archive, 2002, pp. 34-58, vol. 24—Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, ISSN: 0360-0300, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

* cited by examiner

FACE TRACKING IN A CAMERA PROCESSOR

FIELD OF THE INVENTION

The present invention provides an improved method and apparatus for image processing in acquisition devices. In particular, the invention provides improved face tracking in a digital image acquisition device, such as a camera phone.

BACKGROUND

FIG. 1 illustrates digital image acquisition apparatus, for example a camera phone. The apparatus 10 comprises an Image Signal Processor, ISP, 14, which is in general, a general purpose CPU with relatively limited processing power. Typically, the ISP 14 is a dedicated chip or chip-set with a sensor interface 20 having dedicated hardware units that facilitate image processing including image pipeline 22. Images acquired by an imaging sensor 16 are provided to the ISP 14 through the sensor interface 20.

The apparatus further comprises a relatively powerful host processor 12, for example, an ARM9, which is arranged to receive an image stream from the ISP 14.

The apparatus 10 is equipped with a display 18, such as an LCD, for displaying preview images, as well as any main image acquired by the apparatus. Preview images are generated automatically once the apparatus is switched on or only in a pre-capture mode in response to half pressing a shutter button. A main image is typically acquired by fully depressing the shutter button.

Conventionally, high level image processing, such as face tracking, is run on the host processor 12 which provides feedback to the pipeline 22 of the ISP 14. The ISP 14 then renders, adjusts and processes subsequent image(s) in the image stream based on the feedback provided by the host processor 12, typically through an I2C interface 24. Thus, acquisition parameters of the subsequent image in the stream may be adjusted such that the image displayed to the user is enhanced.

Such acquisition parameters include focus, exposure and white balance.

Focus determines distinctness or clarity of an image or relevant portion of an image and is dependent on a focal length of a lens and a capture area of the imaging sensor 16. Methods of determining whether an image is in-focus are well known in the art. For example, if a face region is detected in an image, then given that most faces are approximately the same size and the size of the face within an acquired image, an appropriate focal length can be chosen for a subsequent image to ensure the face will appear in focus in the image. Other methods can be based on the overall level of sharpness of an image or portion of an image, for example, as indicated by the values of high frequency DCT coefficients in the image. When these are highest in the image or a region of interest, say a face region, the image can be assumed to be in-focus. Thus, by adjusting the focal length of the lens to maximize sharpness, the focus of an image may be enhanced.

Exposure of an image relates to an amount of light falling on the imaging sensor 16 during acquisition of an image. Thus an under-exposed image appears quite dark and has an overall low luminance level, whereas an overexposed image appears quite bright and has an overall high luminance level. Shutter speed and lens aperture affect the exposure of an image and can therefore be adjusted to improve image quality and the processing of an image. For example, it is well known that face detection and recognition are sensitive to over or under exposure of an image and so exposure can be adjusted to optimize the detection of faces within an image stream.

Due to the fact that most light sources are not 100% pure white, objects illuminated by a light source will be subjected to a colour cast. For example, a halogen light source illuminating a white object will cause the object to appear yellow. In order for a digital image acquisition apparatus to compensate for the colour cast, i.e. perform white balance, it requires a white reference point. Thus, by identifying a point in an image that should be white, for example the sclera of an eye, all other colours in the image may be compensated accordingly. This compensation information may then be utilised to determine the type of illumination under which an image should be acquired.

While adjusting acquisition parameters such as those described above is useful and can improve image quality and processing, the feedback loop to the ISP 14 is relatively slow, thereby causing delays in providing the ISP 14 with the relevant information to rectify the focus, exposure and white balance of an image. This can mean that in a fast changing scene, adjustment indications provided by the host processor 12 may be inappropriate when they are made by the ISP 14 to subsequent images of the stream. Furthermore, typically most of the processing power available to the host processor 12 is required to run the face tracker application, leaving minimal processing power available for carrying out value added processing.

It is desired to have an improved method of face tracking in a digital image acquisition device.

SUMMARY OF THE INVENTION

A method is provided that is operable in a digital image acquisition system having no photographic film. A relatively low resolution image of a scene from an image stream is received. The scene includes one or more faces. At least one high quality face classifier is applied to the image to identify any relatively large sized face regions. At least one relaxed face classifier is applied to the image to identify one or more relatively small sized face regions. A relatively high resolution image of nominally the same scene is also received. At least one high quality face classifier is applied to at least one of said one or more identified small sized face regions in the higher resolution version of the image.

Steps a) to c) may be performed on a first processor, while steps d) and e) may be separately performed on a second processor. Value-added applications may be performed on the high resolution image on the separate second processor.

Step b) and/or step c) may include providing information including face size, face location, and/or an indication of a probability of the image including a face at or in the vicinity of the face region. A weighting may be generated based on the information. Image acquisition parameters of a subsequent image in the image stream may be adjusted based on the information. The adjusted image acquisition parameters may include focus, exposure and/or white balance. The subsequent image may be a preview image or a main acquired image, and it may be displayed to a user.

A high quality face classifier may include a relatively long cascade classifier or a classifier with a relatively high threshold for accepting a face, or both. The relaxed classifier may include a relatively short cascade classifier or a classifier with a relatively low threshold for accepting a face, or both.

A digital image acquisition apparatus is also provided. A first processor is operably connected to an imaging sensor. A second processor is operably connected to the first processor. The first processor is arranged to provide an acquired image to the second processor and the second processor is arranged to store the image. The first processor is arranged to apply at least one high quality face classifier to a relatively low resolution image of a scene from an image stream, the scene including one or more faces, to identify any relatively large sized face regions, and to apply at least one relaxed face classifier to the image to identify one or more relatively small sized face regions. The second processor is arranged to receive a relatively high resolution image of nominally the same scene and to apply at least one high quality face classifier to at least one identified small sized face region in the higher resolution version of the image.

One or more processor-readable storage devices are provided with program code embodied therein for programming one or more processors to perform any of the methods described herein above or below.

BRIEF DESCRIPTION OF DRAWINGS

Embodiments of the invention will now be described, by way of example, with reference to the accompanying drawings, in which.

DETAILED DESCRIPTION OF THE EMBODIMENTS

Figure 1:
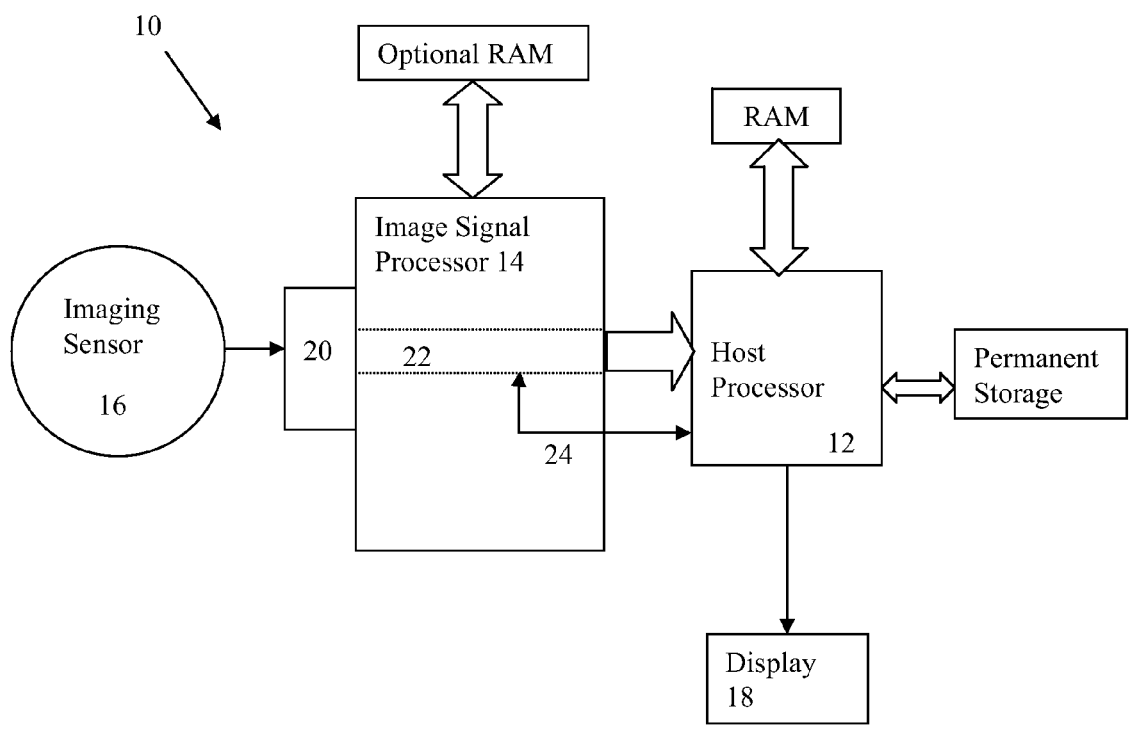
FIG. 1 is a block diagram of a conventional digital image acquisition apparatus. However, certain embodiments of the invention may be combined with one or more features illustrated at FIG. 1.

Face tracking for digital image acquisition devices include methods of marking human faces in a series of images such as a video stream or a camera preview. Face tracking can be used to indicate to a photographer, locations of faces in an image or to allow post processing of the images based on knowledge of the locations of the faces. Also, face tracker applications can be used in adaptive adjustment of acquisition parameters of an image, such as, focus, exposure and white balance, based on face information in order to produce improved the quality of acquired images.

In general, face tracking systems employ two principle modules: (i) a detection module for locating new candidate face regions in an acquired image or a sequence of images; and (ii) a tracking module for confirming face regions.

A well-known method of fast-face detection is disclosed in US 2002/0102024, incorporated by reference, hereinafter Viola-Jones. In Viola-Jones, a chain (cascade) of 32 classifiers based on rectangular (and increasingly refined) Haar features are used with an integral image, derived from an acquired image, by applying the classifiers to a sub-window within the integral image. For a complete analysis of an acquired image, this sub-window is shifted incrementally across the integral image until the entire image has been covered.

In addition to moving the sub-window across the entire integral image, the sub window is also scaled up/down to cover the possible range of face sizes. It will therefore be seen that the resolution of the integral image is determined by the smallest sized classifier sub-window, i.e. the smallest size face to be detected, as larger sized sub-windows can use intermediate points within the integral image for their calculations.

A number of variants of the original Viola-Jones algorithm are known in the literature, such as disclosed in U.S. patent application Ser. No. 11/464,083, which is assigned to the same assignee and in incorporated by reference.

In the present embodiment, a face tracking process runs on the ISP 14 as opposed to the host processor 12. Thus, more processing power of the host processor is available for further value added applications, such as face recognition. Furthermore, parameters of an acquired image, such as focus, exposure and white balance, can be adaptively adjusted more efficiently by the ISP 14.

As will be appreciated, face tracking applications carried out on high resolution images will generally achieve more accurate results than on relatively lower resolution images. Furthermore, tracking relatively small size faces within an image generally requires proportionally more processing than for larger faces.

The processing power of the ISP 14 is of course limited, and so the arrangement of face tracking application according to the present invention is optimized to run efficiently on the ISP 14.

In the preferred embodiment, a typical input frame resolution is 160 by 120, and face sizes are categorised as small, medium or large. Medium sized and large sized faces in an image are detected by applying 14×14 and 22×22 high quality classifiers respectively, e.g. relatively long cascade classifiers or classifiers with a relatively high threshold for accepting a face.

The distance of a subject face from the acquisition apparatus determines a size of the subject face in an image. Clearly, a first subject face located at a greater distance from the acquisition device than a second subject face will appear smaller. Smaller sized faces comprise fewer pixels and thus less information may be derived from the face. As such, detection of smaller sized faces is inherently less reliable even given the proportionally more processing required than for larger faces.

In the preferred embodiment, small sized faces are detected with a relaxed 7×7 classifier, e.g. a short-cascade classifier or classifier with a lower threshold for accepting a face. Using a more relaxed classifier reduces the processing power which would otherwise be required to detect small sized faces.

Nonetheless, it is appreciated that the application of such a relaxed classifier results in a larger number of false positives, i.e. non-face regions being classified as faces. As such, the adjustment of image acquisition parameters is applied differently in response to detection of small faces and the further processing of images is different for small faces than medium or large faces as explained below in more detail.

Figure 2:
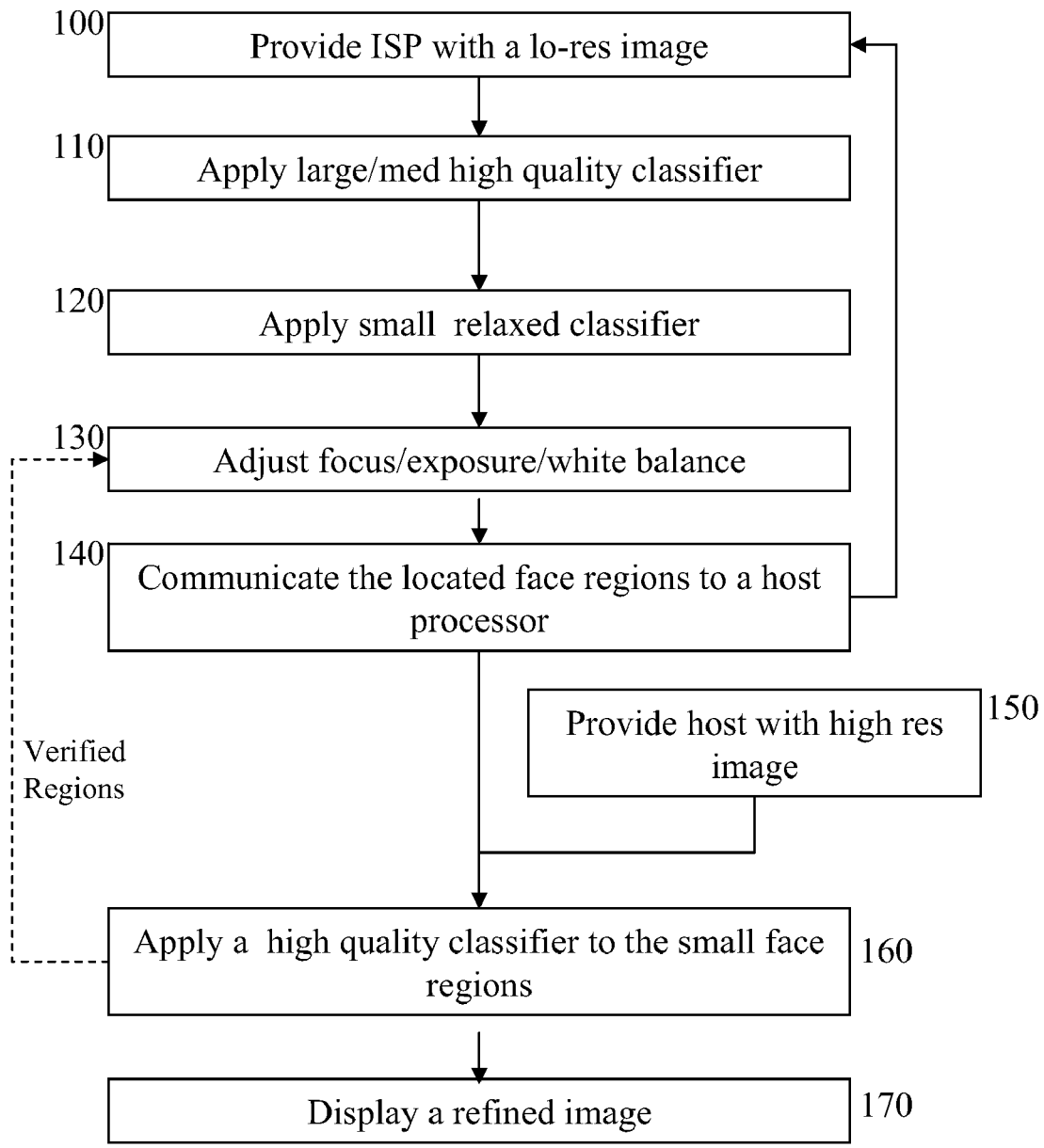
FIG. 2 is a workflow illustrating a preferred embodiment.

FIG. 2 shows a workflow illustrating a preferred embodiment.

On activation, the apparatus 10 automatically captures and stores a series of images at close intervals so that sequential images are nominally of the same scene. Such a series of images may include a series of preview images, post-view images, or a main acquired image.

In preview mode, the imaging sensor 16 provides the ISP 14 with a low resolution image e.g. 160 by 120 from an image stream, step 100.

The ISP 14 applies at least one high quality classifier cascade to the image to detect large and medium sized faces, step 110. Preferably, both 14×14 and 22×22 face classifier cascades are applied to the image.

The ISP 14 also applies at least one relaxed face classifier to the image to detect small faces, step 120. Preferably, a 7×7 face classifier is applied to the image.

Based on knowledge of the faces retrieved from the classifiers, image acquisition parameters for a subsequent image in the stream may be adjusted to enhance the image provided to the display 18 and/or to improve processing of the image. In the preferred embodiment, knowledge of the faces retrieved from the classifiers is utilised to adjust one or more of focus, exposure and/or white balance of a next image in the image stream, step 130.

Knowledge of the faces received from the classifiers comprises information relating to the location of the faces, the size of the faces and the probability of the identified face actually being a face. U.S. patent application Ser. Nos. 11/767,412 and 60/892,883 (FN182/FN232/FN214), which are assigned to the same assignee and the present application and incorporated by reference, discusses determining a confidence level indicating the probability of a face existing at the given location. This information may be utilised to determine a weighting for each face to thereby facilitate the adjustment of the acquisition parameters.

In general, a large face will comprise more information than a relatively smaller face. However, if the larger face has a greater probability of being falsely identified as a face, and/or is positioned at non-central position of the image, it could be allocated a lower weighting even than that of a relatively smaller face, positioned at a centre of the image and comprising a lower probability of being a false positive. Thus, the information derived from the smaller face could be used to adjust the acquisition parameters in preference to the information derived from the large face.

In the embodiment, where only small sized faces are detected in the image, knowledge of the small faces is utilised only to adjust exposure of the next image in the stream. It will be appreciated that although the relaxed classifier passes some false positives, these do not severely adversely influence the adjustment of the exposure.

Focus adjustment is not performed on the next image based on small faces, due to the fact that a lens of the apparatus will be focused at infinity for small faces and there is little to be gained from such adjustment. White balance is not adjusted for small faces because they are considered too small to retrieve any significant white balance information. Nonetheless, each of focus and white balance can be usefully adjusted based on detection of medium and large sized faces.

In the preferred embodiment, once a user acquires a full-sized main image, e.g. by clicking the shutter, and this is communicated to the host, step 150, the detected/tracked face regions are also communicated to the host processor 12, step 140.

In alternative embodiments full-sized images may be acquired occasionally without user intervention either at regular intervals (e.g. every 30 preview frames, or every 3 seconds), or responsive to an analysis of the preview image stream—for example where only smaller faces are detected it may be desirable to occasionally re-confirm the information deduced from such images.

After acquisition of a full-sized main image the host processor 12 retests the face regions identified by the relaxed small face classifier on the larger (higher resolution) main image, typically having a resolution of 320×240, or 640×480, with a high quality classifier, step 160. This verification mitigates or eliminates false positives passed by the relaxed face classifier on the lower resolution image. Since the retesting phase is carried out on a higher resolution version of the image, the small sized faces comprise more information and are thereby detectable by larger window size classifiers. In this embodiment, both 14×14 and 22×22 face classifiers are employed for verification.

Based on the verification, the main image can be adjusted for example, by adjusting the luminance values of the image to more properly illuminate a face or by adjusting the white balance of the image. Other corrections such as red-eye correction or blur correction are also improved with improved face detection.

In any case, the user is then presented with a refined image on the display 18, enhancing the user experience, step 170.

The verification phase requires minimal computation, allowing the processing power of the host processor 12 to be utilised for further value added applications, for example, face recognition applications, real time blink detection and prevention, smile detection, and special real time face effects such as morphing.

In the preferred embodiment, a list of verified face locations is provided back to the ISP 14, indicated by the dashed line, and this information can be utilised to improve face tracking or image acquisition parameters within the ISP 14.

In an alternative embodiment, the verification phase can be carried out on the ISP 14 as although verification is carried out on a higher resolution image, the classifiers need not be applied to the whole image, and as such little processing power is required.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections themselves, and FIGS. 1 and 2, are hereby incorporated by reference into the detailed description of the preferred embodiments as disclosing alternative embodiments and components.

The invention claimed is:

1. A method operable in a digital image acquisition system having no photographic film, comprising:
using a processor in performing the following:
a) receiving a relatively low resolution image of a scene from an image stream, said scene including one or more faces;
b) applying at least one relatively long face classifier to said image to identify any relatively large sized face regions;
c) applying at least one relatively short face classifier to said image to identify one or more relatively small sized face regions;
d) receiving a relatively high resolution image of approximately the same scene; and
e) applying at least one relatively long face classifier to at least one of said one or more identified small sized face regions in said relatively high resolution image.

2. The method according to claim 1, further comprising performing steps a) to c) on a first processor and performing steps d) and e) on a separate second processor.

3. The method according to claim 2, further comprising performing value added applications on said high resolution image on said separate second processor.

4. The method of claim 1 wherein each of steps b) and c) include providing information including face size, face location, and an indication of a probability of said image including a face at or in the vicinity of said face region.

5. The method of claim 1, wherein step b) or step c), or both, include providing information including face size, face location, or an indication of a probability of said image including a face at or in the vicinity of said face region, or combinations thereof.

6. The method of claim 5 further comprising generating a weighting based on said information.

7. The method according to claim 5 comprising adjusting one or more image acquisition parameters of a subsequent image in said image stream based on said information.

8. The method according to claim 7 wherein said one or more image acquisition parameters that are adjusted include focus, exposure or white balance, or combinations thereof.

9. The method according to claim 7 wherein said subsequent image in said stream is a preview image.

10. The method according to claim 7 wherein said subsequent image in said stream is a main acquired image.

11. The method according to claim 7 further comprising displaying said subsequent image to a user.

12. The method according to claim 1, wherein said at least one relatively long face classifier comprises a classifier with a relatively high threshold for accepting a face, or said relatively short classifier comprises a classifier with a relatively low threshold for accepting a face, or both.

13. A digital image acquisition apparatus, comprising a first processor coupled to an imaging sensor, and a second processor coupled to said first processor, wherein said first processor is arranged to provide an acquired image to said second processor and said second processor is arranged to store said image, and wherein said first processor is arranged to apply at least one relatively long face classifier to a relatively low resolution image of a scene from an image stream, said scene including one or more faces, to identify any relatively large sized face regions, and to apply at least one relatively short face classifier to said image to identify one or more relatively small sized face regions; and wherein said second processor is arranged to receive a relatively high resolution image of approximately the same scene and to apply at least one relatively long face classifier to at least one of said one or more identified small sized face regions in said relatively high resolution image.

14. One or more non-transitory processor-readable storage devices having program code embodied therein for programming one or more processors to perform a method operable in a digital image acquisition system having no photographic film, wherein the method comprises:

a) receiving a relatively low resolution image of a scene from an image stream, said scene including one or more faces;

b) applying at least one relatively long face classifier to said image to identify any relatively large sized face regions;

c) applying at least one relatively short face classifier to said image to identify one or more relatively small sized face regions;

d) receiving a relatively high resolution image of approximately the same scene; and e) applying at least one relatively long face classifier to at least one of said one or more identified small sized face regions in said relatively high resolution image.

15. The one or more storage devices of claim 14, wherein the method further comprises performing steps a) to c) on a first processor and performing steps d) and e) on a separate second processor.

16. The one or more storage devices of claim 15, wherein the method further comprises performing value added applications on said high resolution image on said separate second processor.

17. The one or more storage devices of claim 14, wherein each of steps b) and c) include providing information including face size, face location, and an indication of a probability of said image including a face at or in the vicinity of said face region.

18. The one or more storage devices of claim 14, wherein step b) or step c), or both, include providing information including face size, face location, or an indication of a probability of said image including a face at or in the vicinity of said face region, or combinations thereof.

19. The one or more storage devices of claim 18, wherein the method further comprises generating a weighting based on said information.

20. The one or more storage devices of claim 18, wherein the method further comprises adjusting image acquisition parameters of a subsequent image in said image stream based on said information.

21. The one or more storage devices of claim 20, wherein said adjusted image acquisition parameters include focus, exposure or white balance, or combinations thereof.

22. The one or more storage devices according to claim 20, wherein said subsequent image in said stream comprises a preview image.

23. The one or more storage devices of claim 20, wherein said subsequent image in said stream comprises a main acquired image.

24. The one or more storage devices of claim 20, wherein the method further comprises displaying said subsequent image to a user.

25. The one or more storage devices of claim 14, wherein said at least one relatively long face classifier comprises a classifier with a relatively high threshold for accepting a face, or said relatively short classifier comprises a classifier with a relatively low threshold for accepting a face, or both.

* * * * *